United States Patent Office.

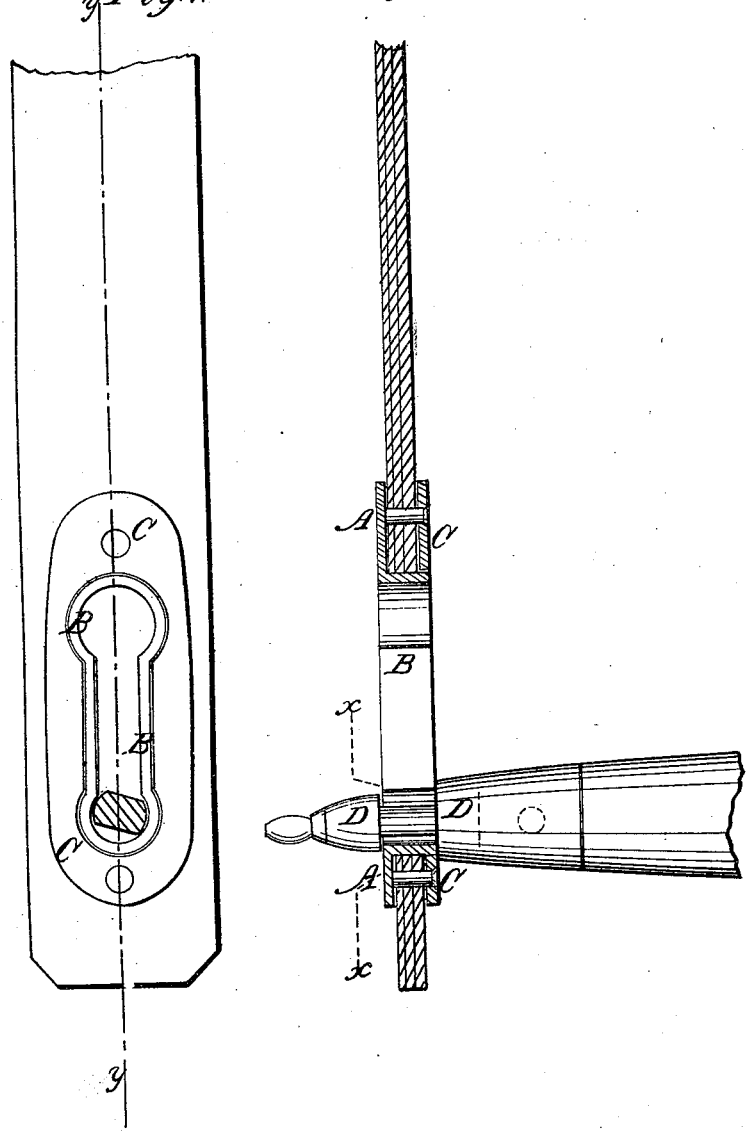

CHARLES H. NYE, OF ELIZABETHPORT, NEW JERSEY.

Letters Patent No. 87,870, dated March 16, 1869.

IMPROVEMENT IN ATTACHING TUGS TO WHIFFLE-TREES.

The Schedule referred to in these Letters Patent and making part of the same.

*To all whom it may concern:*

Be it known that I, CHARLES H. NYE, of Elizabethport, Union county, New Jersey, have invented a new and useful Improvement in Attaching Tugs to Whiffle-Trees; and I do hereby declare that the following is a full, clear, and exact description thereof, which will enable others skilled in the art to make and use the same, reference being had to the accompanying drawings, forming part of this specification.

Figure 1 represents a side view of my improved fastening, partly in section, through the line $x\,x$, fig. 2.

Figure 2 is a detail sectional view of the same, taken through the line $y\,y$, fig. 1.

Similar letters of reference indicate corresponding parts.

My invention has for its object to furnish an improved device for attaching tugs to whiffle-trees, which shall be strong, simple in construction, easily attached and detached, and not liable to become accidentally detached; and It consists in the device hereinafter more fully described.

A is a plate, around an opening, in the middle part of which is formed a socket, or flange, B, of such a height as to reach through the tug, and through the loose, or detached plate C, placed upon the other side of the tug from the plate A.

The plates A and C may be connected and secured to each other and to the tug, by pins, cast upon the one plate, and passing through the tug and through the other plate, to which they are securely riveted.

Or, if desired, the said pins may be passed through and riveted to both the plates A C.

The socket B is made in the shape shown in fig. 1, that is to say, in the shape of a slot, enlarged at both ends, the enlargement at the forward end being made large enough to receive the knob of the whiffle-tree socket D, and the enlargement at the rear end being made large enough to receive the neck of the socket-knob D, but not large enough to allow said knob to pass through.

D is the knob-socket, the inner end of which is made in the form of a socket, to receive the end of the whiffle-tree, to which it is secured by rivets or screws in the ordinary manner.

The outer end of the socket D is made in the form of a knob, the neck of which is somewhat flattened, as shown in fig. 1, the said socket D being attached to the whiffle-tree in such a position that the said flattened neck may be a little angling, as shown in fig. 1.

The flattened neck of the socket-knob D should be of such a thickness that it may slide through the middle, or narrow part of the tug-socket A B C.

The outer end, or knob, of the socket D may be made of any desired form, and may be ornamented, to conform to the mounting of the harness.

In using the device, the knob of the whiffle-tree socket D is passed through the forward, or larger end of the tug-socket A B C. The tug is then raised, so that the socket can be slid upward and forward upon the flattened neck of the socket-knob D, until the said neck reaches the rear end of said socket A B C. The tug is then dropped into its proper position, and is fastened to the whiffle-tree so securely, that it cannot become detached, while in any position into which it is possible for it to get while being used.

In detaching the fastening, the tug is raised to the proper angle, and pushed back, until the knob D can pass out through the enlarged forward end of the socket A B C.

I claim as new, and desire to secure by Letters Patent—

1. The socket A B C, constructed substantially as herein shown and described, for attachment to a harness-tug, as and for the purpose set forth.

2. The socket-knob D, constructed with a flattened neck, for attachment to a whiffle-tree, substantially as herein shown and described, and for the purpose set forth.

3. The tug-socket A B C and the socket-knob D, when used in connection with each other, for attaching tugs to whiffle-trees, substantially as herein shown and described, and for the purpose set forth.

CHAS. H. NYE.

Witnesses:
W. H. ELLIS,
J. H. FRANKLIN.